(12) United States Patent
Sugimori

(10) Patent No.: US 9,357,106 B2
(45) Date of Patent: May 31, 2016

(54) INFORMATION PROCESSING APPARATUS, IMAGING APPARATUS, AND METHOD FOR CORRECTING IMAGES

(71) Applicant: CANON KABUSHIKI KAISHA, Tokyo (JP)

(72) Inventor: Masami Sugimori, Yamato (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/035,785

(22) Filed: Sep. 24, 2013

(65) Prior Publication Data

US 2014/0022420 A1  Jan. 23, 2014

Related U.S. Application Data

(63) Continuation of application No. 12/707,586, filed on Feb. 17, 2010, now Pat. No. 8,570,392.

(30) Foreign Application Priority Data

Feb. 19, 2009 (JP) .................................. 2009-036657

(51) Int. Cl.
*H04N 5/217* (2011.01)
*H04N 5/232* (2006.01)
*G03B 17/14* (2006.01)

(52) U.S. Cl.
CPC ................ *H04N 5/217* (2013.01); *G03B 17/14* (2013.01); *H04N 5/2176* (2013.01); *H04N 5/232* (2013.01); *H04N 5/23293* (2013.01)

(58) Field of Classification Search
CPC ..... H04N 5/217; H04N 5/2176; H04N 5/232; H04N 5/23293; H04N 5/23296; H04N 5/23216; H04N 2101/00; H04N 5/2628; G03B 17/14
See application file for complete search history.

(56) References Cited

U.S. PATENT DOCUMENTS

| 8,237,852 B2 * | 8/2012 | Shibuno et al. ................ 348/360 |
| 2002/0097324 A1 * | 7/2002 | Onuki ............................ 348/208 |
| 2003/0002749 A1 * | 1/2003 | Vehvilainen ................... 382/275 |

(Continued)

FOREIGN PATENT DOCUMENTS

| JP | S61-225988 A | 10/1986 |
| JP | H11-313250 A | 11/1999 |
| JP | 2000-125175 A | 4/2000 |

(Continued)

*Primary Examiner* — Luong T Nguyen
(74) *Attorney, Agent, or Firm* — Canon USA Inc., IP Division

(57) ABSTRACT

An information processing apparatus includes a first acquisition unit configured to acquire a first image generated based on light passing through a lens unit, a second acquisition unit configured to acquire information corresponding to a pupil distance of the lens unit when the first image is acquired, and a correction unit configured to generate a second image, which is generated by correcting optical characteristics of the lens unit based on a position of the lens unit at the time of acquisition of the first image, wherein the correction unit corrects the first image affected by the optical characteristics based on the lens position of the lens unit based on the information corresponding to the pupil distance acquired by the second acquisition unit.

52 Claims, 14 Drawing Sheets

(56) References Cited

U.S. PATENT DOCUMENTS

| | | | |
|---|---|---|---|
| 2005/0206734 A1* | 9/2005 | Kubo et al. | 348/207.1 |
| 2005/0237417 A1* | 10/2005 | Miyasaka | 348/335 |
| 2005/0275904 A1* | 12/2005 | Kido et al. | 358/461 |
| 2007/0132878 A1* | 6/2007 | Tanaka | 348/360 |
| 2008/0088728 A1* | 4/2008 | Omaki et al. | 348/333.01 |
| 2009/0009633 A1* | 1/2009 | Suto | 348/241 |

FOREIGN PATENT DOCUMENTS

| | | |
|---|---|---|
| JP | 2000-184247 A | 6/2000 |
| JP | 2002-190979 A | 7/2002 |
| JP | 2003-163826 A | 6/2003 |
| JP | 2006-267770 A | 10/2006 |
| WO | 2008/044591 A1 | 4/2008 |

* cited by examiner

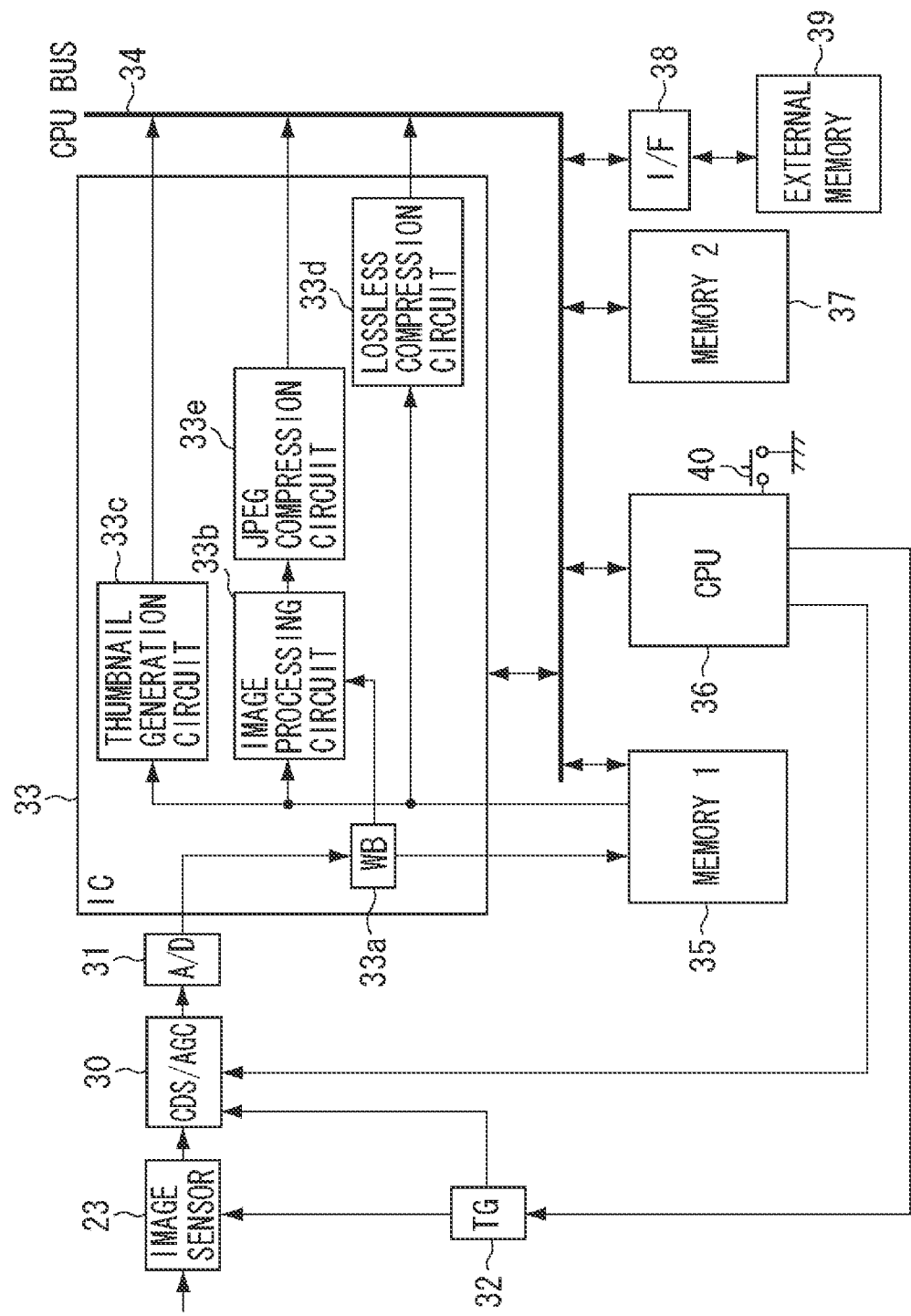

FIG. 5B

| FOCAL LENGTH<br>DISTANCE FROM<br>CENTER OF IMAGE SENSOR | 28mm | 39.3mm | 65.6mm | 200mm |
|---|---|---|---|---|
| 0mm | 0 | 0 | 0 | 0 |
| 6mm | 0.28 | 0.23 | 0.15 | 0.14 |
| 12mm | 0.88 | 0.60 | 0.33 | 0.2 |
| 17mm | 1.71 | 1.10 | 0.78 | 0.26 |
| 20mm | 2.30 | 1.70 | 1.20 | 0.32 |
| 22mm | 3.21 | 2.19 | 1.47 | 0.42 |

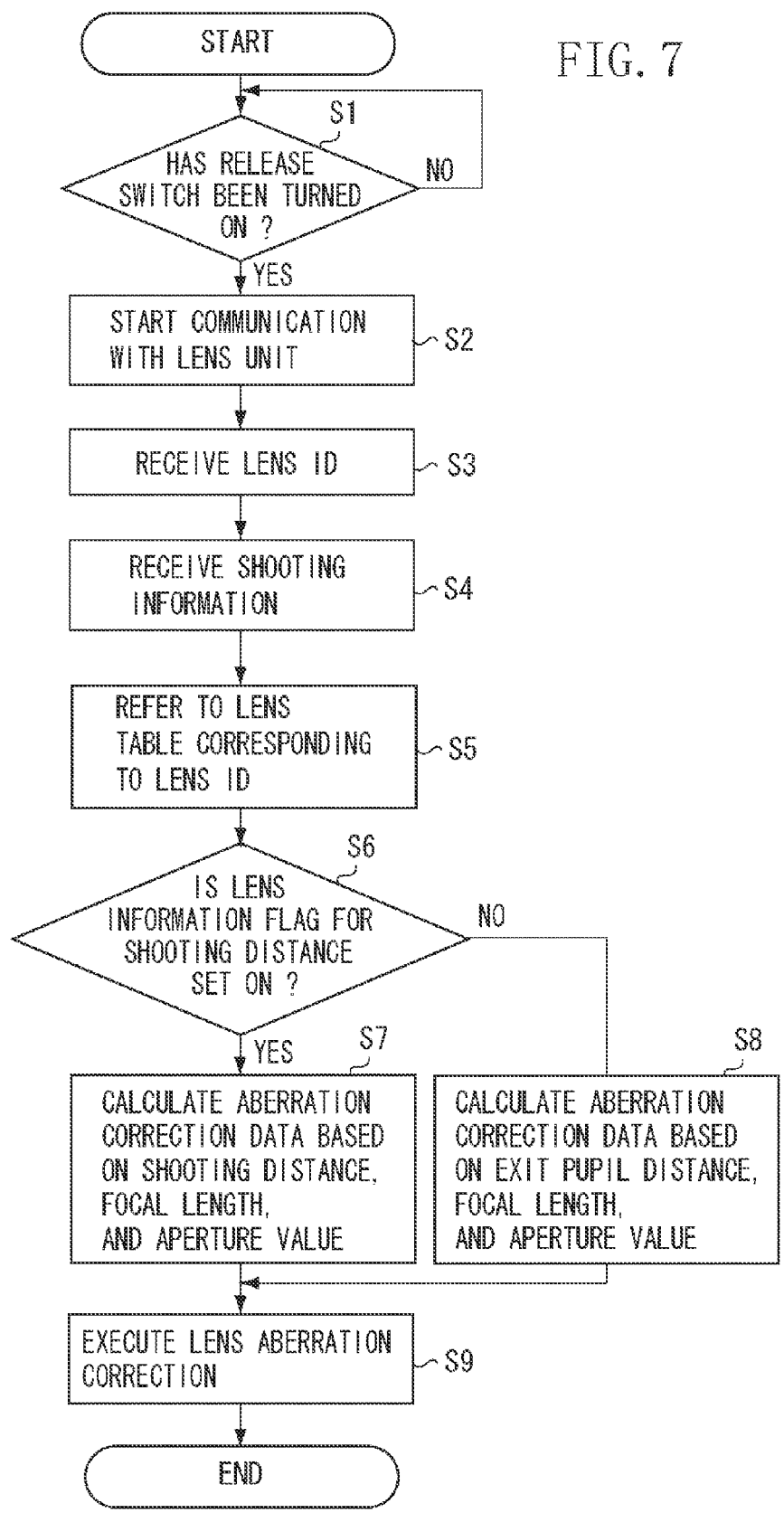

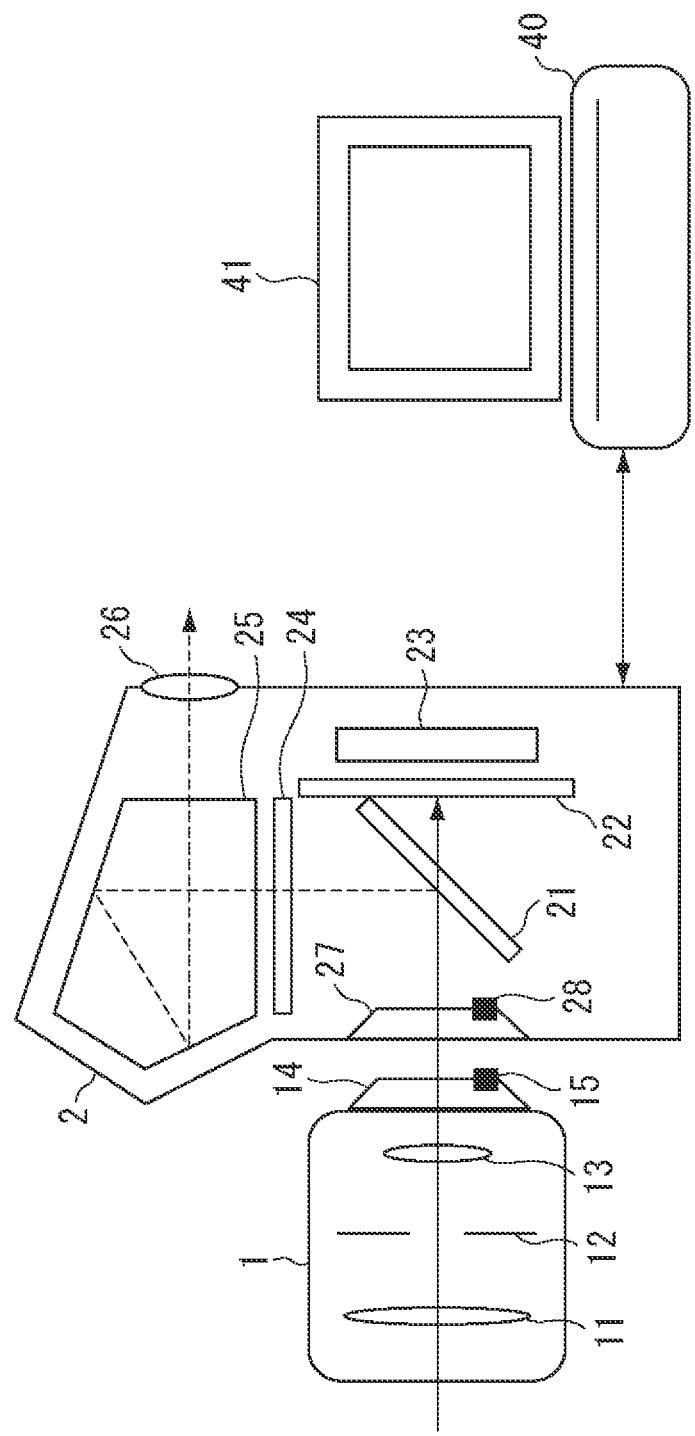

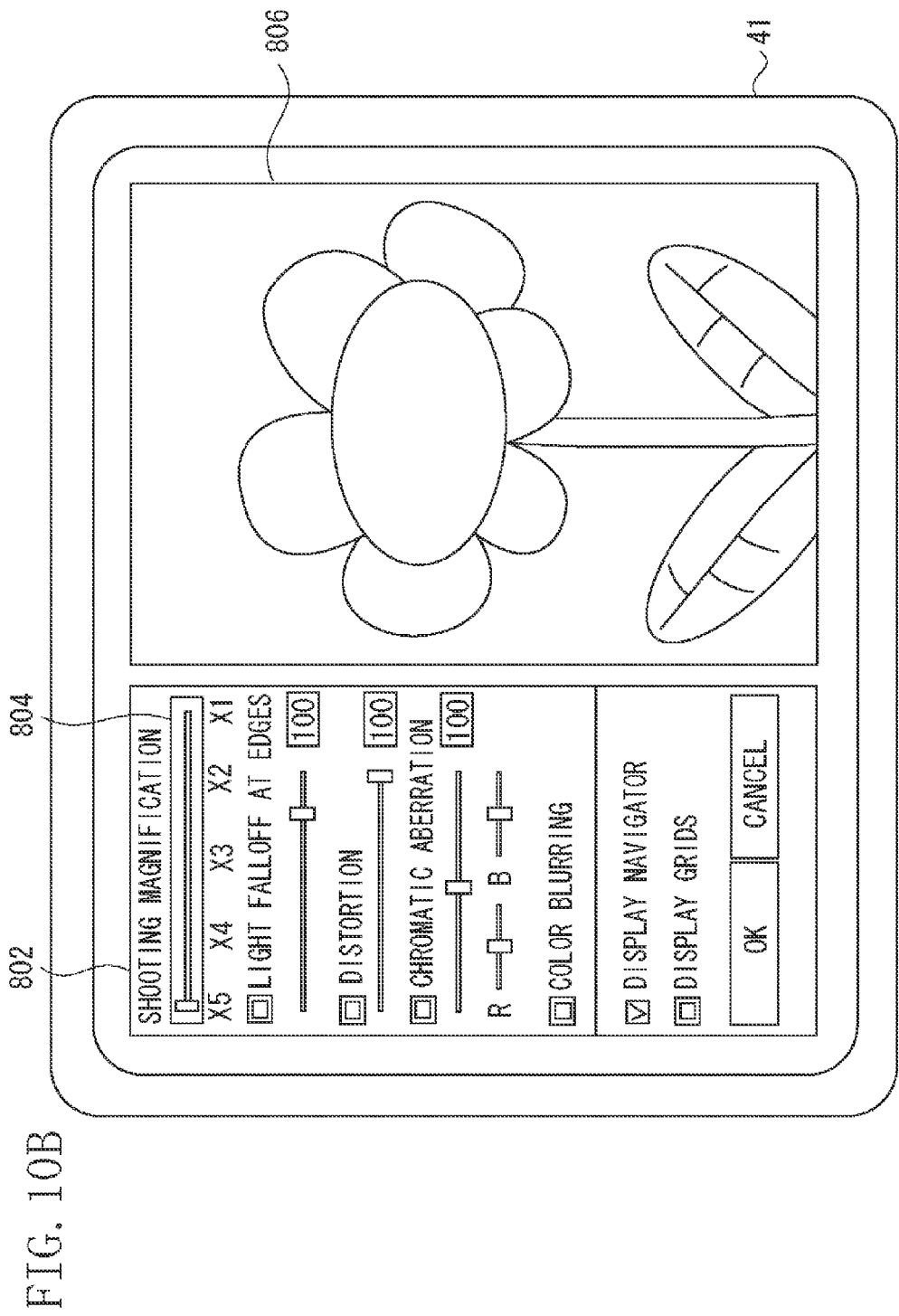

INFORMATION PROCESSING APPARATUS, IMAGING APPARATUS, AND METHOD FOR CORRECTING IMAGES

CROSS-REFERENCE TO RELATED APPLICATIONS

This application is a Continuation of co-pending U.S. patent application Ser. No. 12/707,586 filed Feb. 17, 2010, which claims the priority benefit of Japanese Patent Application No. 2009-036657 filed Feb. 19, 2009. The disclosures of the above-named applications are hereby incorporated by reference herein in their entirety.

BACKGROUND OF THE INVENTION

1. Field of the Invention

The invention relates to a technique for correcting optical characteristics of a lens by image processing.

2. Description of the Related Art

As a correction of image deterioration due to optical characteristics, a correction value is ordinarily calculated based on information from a lens unit. The information can include a shooting distance, a focal length, and an aperture value, and the like, and the correction value is calculated from the information for correction. An image without aberration and distortion caused by the optical characteristics can be obtained by the correction (see Japanese Patent Application Laid-Open No. 5-158134).

Further, when an intermediate adaptor, such as an extender and the like, is interposed into an interchangeable lens unit of a single-lens reflex camera, an aperture value of the lens unit may not indicate a correct value. To cope with the above issue, the camera can include length information of the intermediate adaptor and an aperture value correction table corresponding to an exit pupil distance (see Japanese Patent Application Laid-Open No. 2007-17891).

However, the optical characteristics of a lens unit may not be specified even based on the shooting distance, focal length, and aperture value. For example, there may be a case where a shooting magnification to a change of a shooting distance does not correspond to a change of the shooting distance in the relation of 1:1, as occurring in a macro lens. When the optical characteristics are corrected based on a lens position using information corresponding to a shooting distance, an erroneous correction may be performed.

SUMMARY OF THE INVENTION

According to an aspect of the invention, an information processing apparatus includes a first acquisition unit configured to acquire a first image generated based on light passing through a lens unit, a second acquisition unit configured to acquire information corresponding to a pupil distance of the lens unit when the first image is acquired, and a correction unit configured to generate a second image, which is generated by correcting optical characteristics of the lens unit based on a position of the lens unit at the time of acquisition of the first image, wherein the correction unit corrects the first image affected by the optical characteristics based on the lens position of the lens unit based on the information corresponding to the pupil distance acquired by the second acquisition unit.

According to another aspect of the invention, an information processing apparatus includes an acquisition unit configured to acquire identification information of a lens unit, and a display control unit configured to perform control for selectively displaying one of shooting distance information and shooting magnification information according to the identification information of the lens unit acquired by the acquisition unit when a user operably displays image processing for correcting an effect of optical characteristics based on a lens position of the lens unit, wherein when the display control unit displays the shooting magnification information, the display control unit acquires information corresponding to a pupil distance of the lens unit and performs the image processing for correction based on the information corresponding to the pupil distance.

According to an exemplary embodiment of the invention, optical characteristics based on the lens position can be corrected even when a shooting magnification does not correspond to a change of a shooting distance in the relation of 1:1.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 2 is a schematic view illustrating an internal configuration of the digital camera according to the first exemplary embodiment.

FIGS. 5A and 5B illustrate correction values obtained by an interpolation method for correcting the lens aberration data in the first exemplary embodiment.

FIG. 7 is a flowchart illustrating part of a process performed by a digital camera according to the first exemplary embodiment.

FIG. 8 is a view illustrating a configuration of a digital camera operatively connected to an external information processing apparatus according to a second exemplary embodiment of the invention.

FIGS. 10A and 10B are views illustrating an operation panel of the information processing apparatus according to the second exemplary embodiment.

DESCRIPTION OF THE EMBODIMENTS

Various exemplary embodiments, features, and aspects of the invention will be described in detail below with reference to the drawings.

Figure 1:
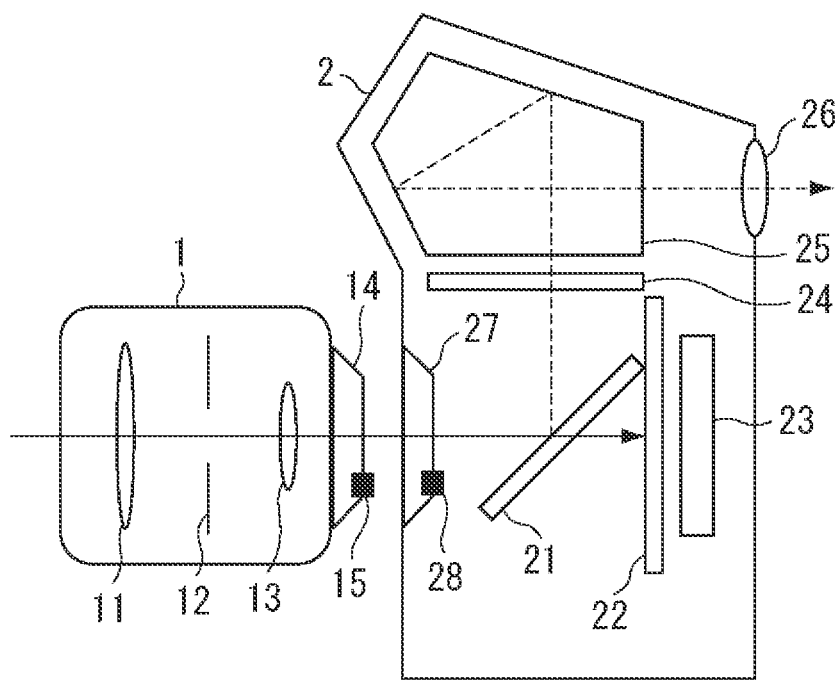
FIG. 1 is a view illustrating a configuration of a digital camera according to a first exemplary embodiment of the invention.

FIG. 1 is a view illustrating a configuration of a digital camera having a lens unit according to a first exemplary embodiment of the invention. For purposes of description and example, the embodiment of FIG. 1 illustrates an interchangeable lens unit. However, the present invention is not limited thereto, and other types of lens unit can be equally applicable. An interchangeable lens unit 1 includes a zoom lens 11 for changing a focal length, a diaphragm mechanism 12 for controlling brightness, a focus lens 13 for focusing on an object, and a mount portion 14 for interchangeably attaching the lens unit to a digital camera 2. However, a lens unit having a single focus lens cannot change the focal length. In addition, a macro lens has a fixed focal length. In the case of a lens having an unchangeable or fixed focal length, a shooting magnification is changed in place of a shooting distance. That is, focusing is performed by changing the shooting magnification. In the context of the present specification, the shooting distance is an object distance, or more specifically a distance from an object to the position of the digital camera, such as the position of the focus lens.

In the interchangeable lens unit 1, the mount portion 14 serves to join the lens unit 1 to a mount unit 27 of the digital camera 2 so that communication can be performed therebetween. The digital camera 2 reflects light passing through the lens unit 1 by a half mirror 21 and focuses the light at the position of a focusing screen 24. The light focused on the focusing screen 24 is reversed by a prism 25 and can be observed as an erected image through an eyepiece lens 26.

Further, in a shooting state, the half mirror 21 of the digital camera 2 is moved upward, and a shutter 22 opens. Accordingly, the light passing through the lens unit 1 is focused on an image sensor 23.

A contact group 15 is assembled to the mount portion 14 of the interchangeable lens unit 1. The contact group 15 includes contact points (not illustrated), which are supplied with power from the digital camera main body to perform communication. The contact group 15 can be used for various uses, such as for power supply, ground, transmission, reception, and clock.

The mount portion 14 of the interchangeable lens unit 1 is joined to the mount unit 27 of the digital camera 2. With this configuration, connection terminals in the contact group 15 on the mount portion 14 are connected to respective connection terminals in a contact group 28 on the mount unit 27.

As a result of the above-described configuration, power is supplied from the digital camera 2 to the interchangeable lens unit 1 through the connection terminals of contact groups 15 and 28. Similarly, communication between the interchangeable lens unit 1 and the digital camera 2 can be performed through the contact groups 15 and 28.

FIG. 2 illustrates an internal configuration of the digital camera 2. The image sensor 23 is a sensor such as CCD (charge-coupled device) or a CMOS (complementary metal-oxide semiconductor) device. The light focused on the image sensor 23 is converted into charges with an amount corresponding to the amount of incident light in respective pixels in the image sensor 23. A signal generated by a timing generator (TG) 32 is used to drive the image sensor 23, transmit charges stored in the sensor, and sequentially convert the charges into a voltage signal. The converted voltage signal is sampled and amplified by a combined correlated double sampling (CDS)/automatic gain control (AGC) circuit 30. The sampled/amplified signal is then converted into a digital signal by an A/D converter 31.

Image data converted into the digital signal is input to an integrated circuit (IC) 33. In the IC 33, the input image data is input to a white balance (WB) circuit 33a for calculating data for white balance, and is then temporarily stored on a memory (1) 35. The image data stored on the memory (1) 35 is input to the IC 33 again and subjected to at least three image processing operations.

Figure 3A:
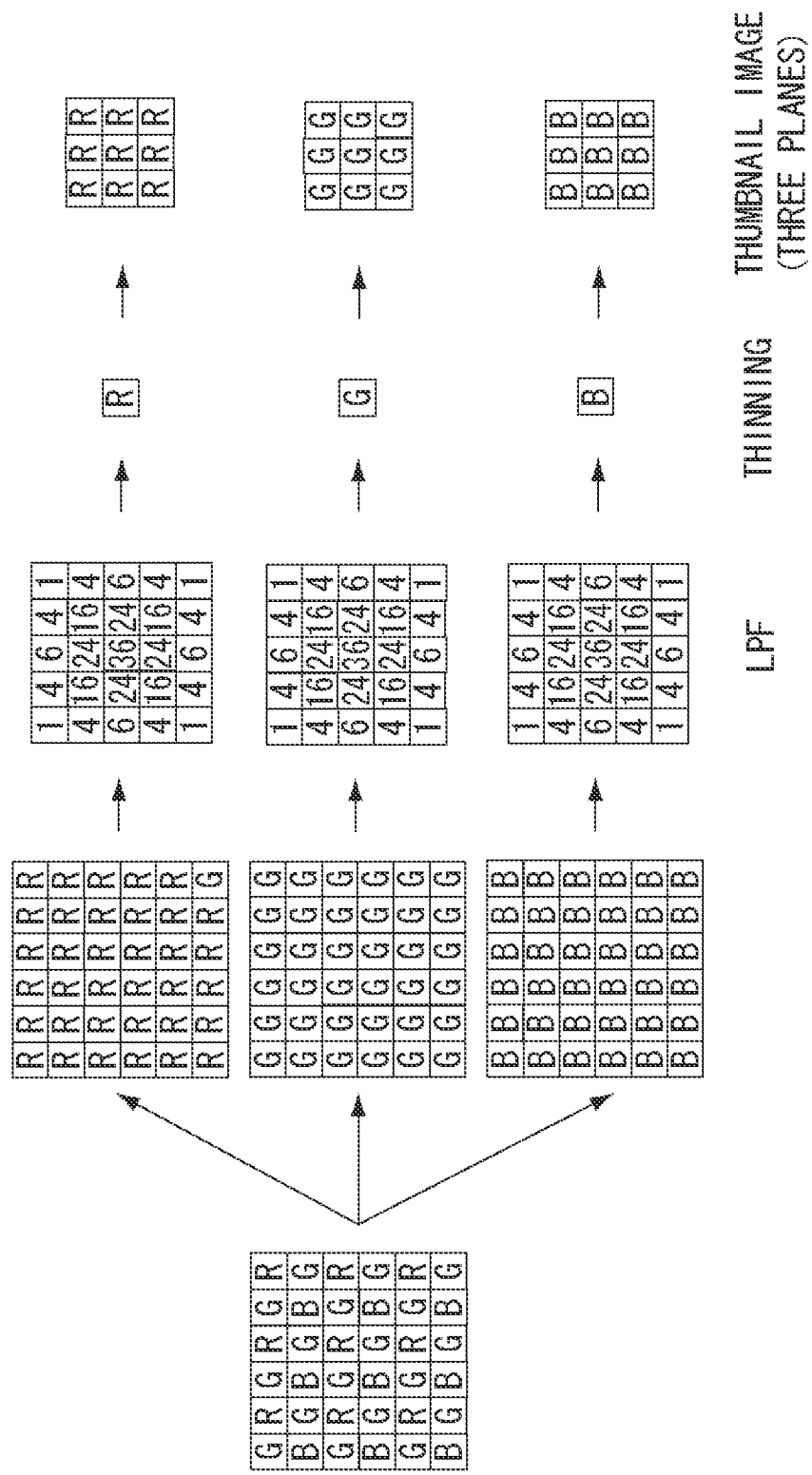
FIGS. 3A and 3B illustrate procedures for generating a thumbnail image according to the first exemplary embodiment.
Figure 3B:
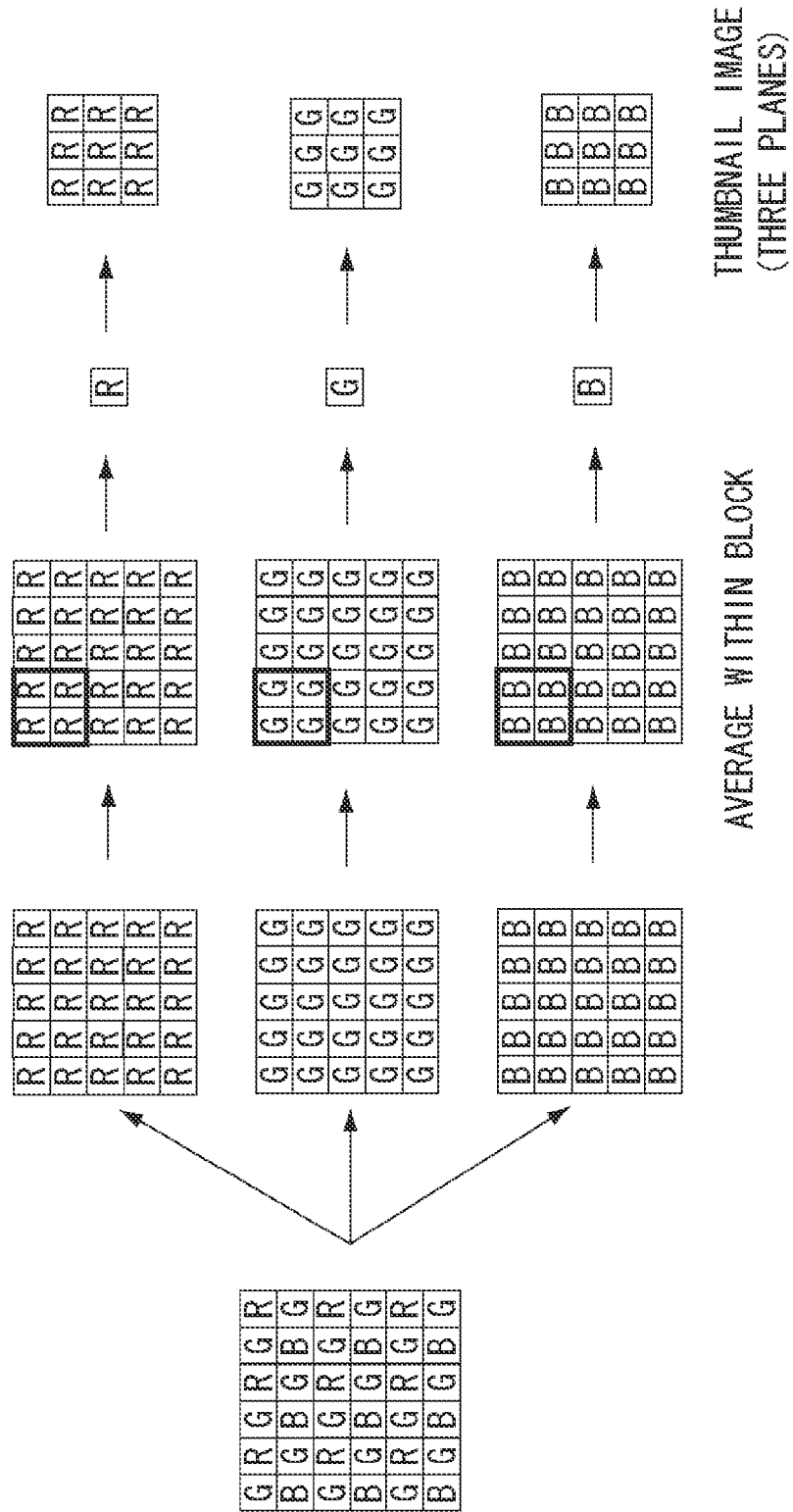

First, the image data converted into the digital signal is converted into RAW data. RAW data is lossless data that is compressed in a lossless compression circuit 33d for applying lossless compression (reversible compression), and is then sent to a CPU bus 34. In addition, the image data converted into the digital signal is sent to the CPU bus 34 via a RAW thumbnail generation circuit 33c. In this instance, as illustrated in, for example, FIGS. 3A and 3B, a band is limited by averaging the RAW data in a block or causing the RAW data to pass through a low-pass filter. Then, the RAW data is down sampled by being thinned therefrom and subjected to a thinning process in the RAW thumbnail generation circuit 33c, so that the RAW data is converted into a thumbnail image smaller than an original image size. More specifically, FIG. 3A illustrates thinning of RAW data. Alternatively, FIG. 3B illustrates averaging of RAW data.

Finally, the image data converted into the digital signal is used to generate a compressed image. To generate a compressed image, for example with jpeg (joint photographic experts group) compression, image processing is performed in an image processing circuit 33b. In this case, a YCbCr output as a result of the image processing is converted into a raster block, jpeg compressed in a jpeg compression circuit 33e, and sent to the CPU bus 34.

The image processing circuit 33b calculates correction data for correcting a first image affected by the optical characteristics of the lens unit 1 according to shooting information of the lens unit 1. Then, the image processing circuit 33b generates a second image by correcting the first image with the calculated correction data. The shooting information of the lens unit 1 is information corresponding to a lens ID as identification information of the lens unit 1, information corresponding to the focal length, information corresponding to the shooting distance, information corresponding to the aperture value, or the like.

Just after power is supplied, a central processing unit (CPU) 36 initializes the digital camera 2 according to a program stored on a memory (2) 37 and starts communication with the lens unit 1.

Further, the CPU 36 temporarily stores image data output to the CPU bus 34 on the memory (1) 35 in captured image data and finally writes the image data to an external memory 39 through an interface circuit (I/F) 38. A switch 40 connected to the CPU 36 is a release switch. The shooting operation is performed by pressing the switch 40, and the captured image data and shooting information of the lens unit 1 related to the image data captured during shooting are written to the external memory 39.

Figure 4A:
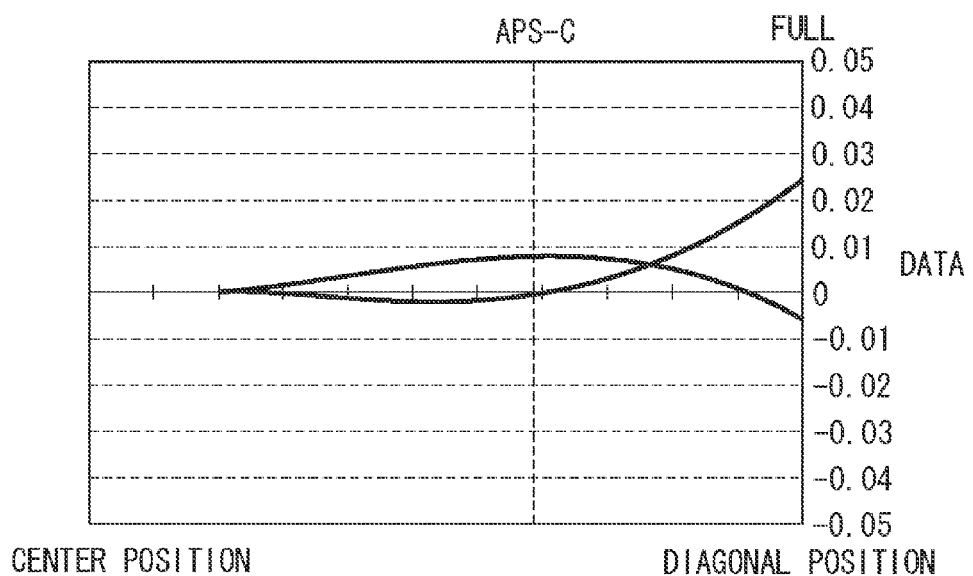
FIGS. 4A to 4C illustrate lens aberration data in the first exemplary embodiment.
Figure 4B:
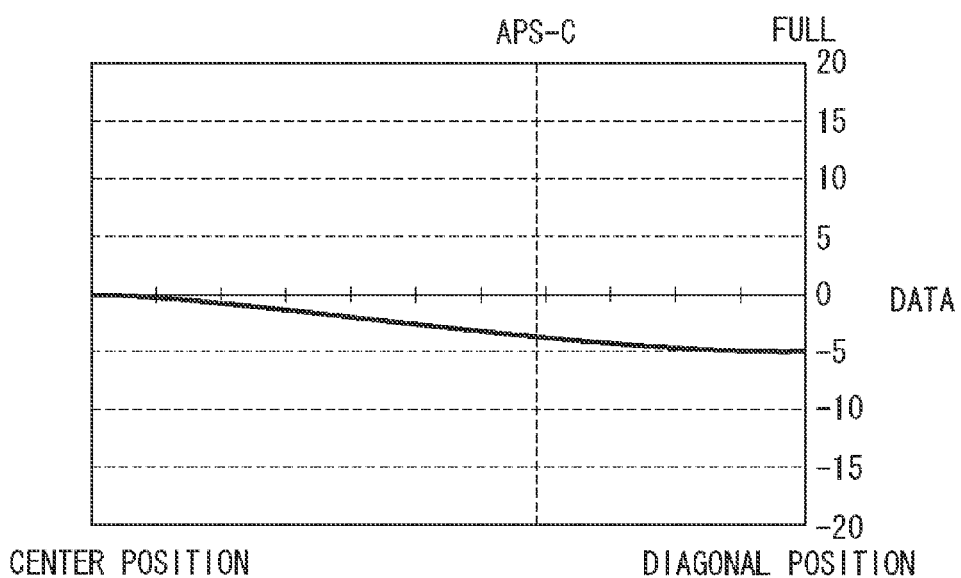
Figure 4C:
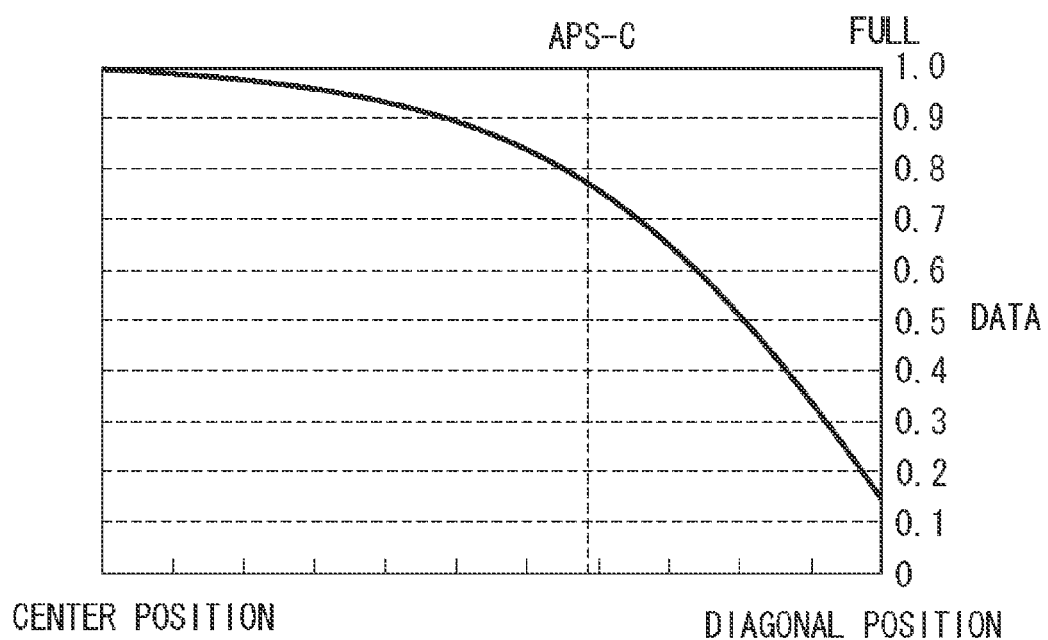

FIGS. 4A to 4C illustrate correction data for correcting image data affected by the optical characteristics of the lens unit 1.

FIG. 4A illustrates data of chromatic aberration of magnification (lateral chromatic aberration) at a given lens position. The horizontal axis indicates a distance corresponding to about 21 mm from a center of the sensor to a diagonal position. The vertical axis indicates an amount of deviation of wavelength components representing red and blue relative to a wavelength representing green. A minus means that the wavelength component is shifted to a center corresponding to a position whose length is shorter than that of green. On the contrary, a plus means that the wavelength component is shifted to an outside corresponding to a position whose length is longer than that of green. An image without chromatic aberration of magnification can be obtained by returning pixel data to a position corresponding to the amount of deviation.

FIG. 4B illustrates data of distortion at a given lens position. The horizontal axis indicates a distance corresponding to about 21 mm from the center of the sensor to a diagonal position as in FIG. 4A. The vertical axis indicates an amount of deviation from the position of an image when no distortion exists. A minus indicates that the image is located at a position having a distance shorter that of an original position with a result that the image has barrel type distortion. A plus indicates that the image is located at a position having a distance shorter that of an original position with a result that the image has pincushion type distortion. A type of distortion which intersects from a minus to a plus and from a plus to a minus in a mid-portion is called moustache or gull-wing type distortion. The distortion can be corrected by entirely moving RGB pixels to the same position to return a distance corresponding to the amount of distortion to the original position.

FIG. 4C illustrates data of light falloff at edges at a given lens position. The horizontal axis indicates a distance corresponding to about 21 mm from the center of the sensor to a diagonal position. The vertical axis indicates a component of light falloff at edges when brightness at the center of a lens is shown by 100%. The light falloff at edges can be corrected by correcting an amount of light falloff relative to the position.

FIGS. 4A to 4C illustrate an effect of optical characteristics of the lens unit on an image obtained at a given lens position. In this point, curves of the effect on the obtained image by the optical characteristics of the lens unit illustrated in FIGS. 4A to 4C are different depending on the respective lens positions. Accordingly, the amount of data greatly increases to correct the effect due to the optical characteristics of the lens unit. The lens position described here corresponds to information such as the shooting distance and the focal length, and the effect due to the optical characteristics of the lens unit illustrated in FIGS. 4A to 4C changes also according to the aperture value.

Figure 5A:
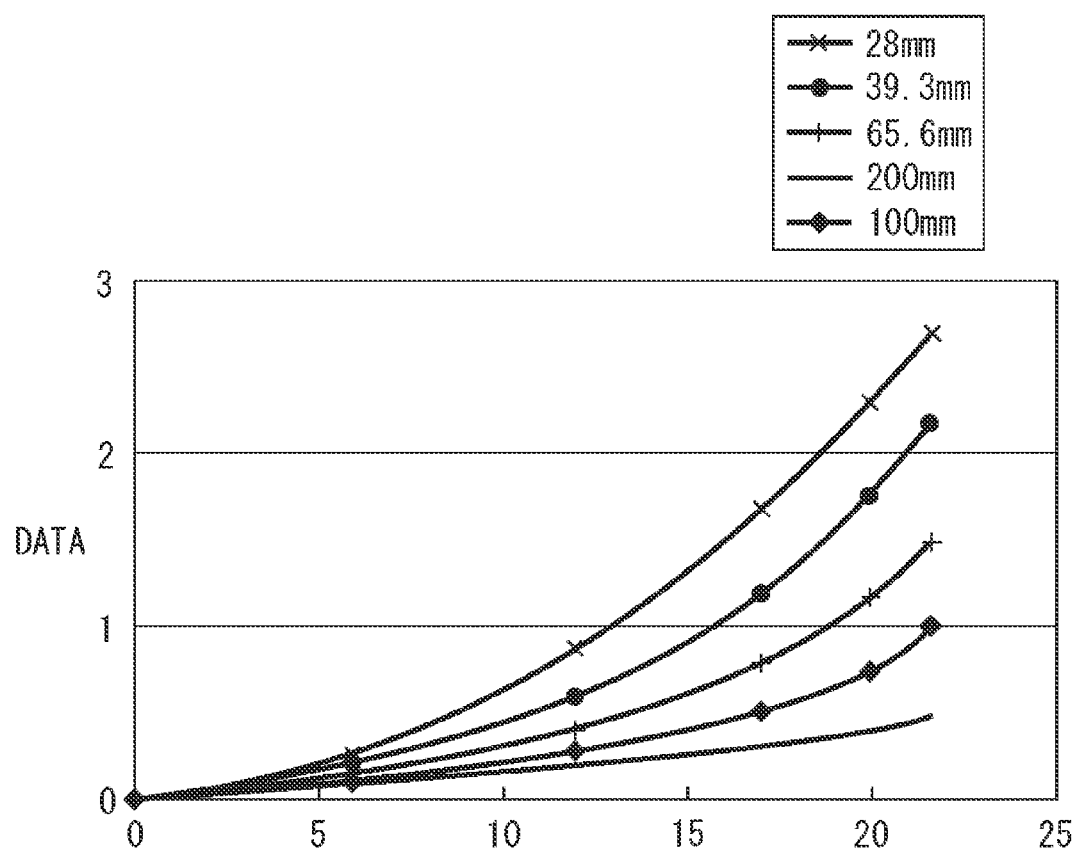

Correction values can be stored as a correction table (as illustrated in FIG. 5B) in a storage device, such as memory (2) 37 or an external device. FIGS. 5A and 5B illustrate data of light falloff at edges illustrated in FIG. 4C in each focal length of the effect due to the optical characteristics of the lens unit illustrated in FIGS. 4A to 4C. FIG. 5A illustrates the data in a graph, and FIG. 5B illustrates the data in a table. Since chromatic aberration of magnification illustrated in FIG. 4A and distortion illustrated in FIG. 4B are illustrated also by correction graphs as in light falloff at edges illustrated in FIG. 4C, a description thereof is omitted.

In FIG. 5A, when a shooting condition between pieces of data is provided as a correction table, the table can be made by interpolation. As illustrated in FIG. 5A, for example, in a lens unit having a zoom lens from 28 mm to 200 mm, a zoom region is equally divided into three regions, and four typical values are provided as illustrated in FIG. 5A. Thus, when shooting is performed with the focal length of 100 mm, data of the focal length of 100 mm is interpolated from data of a focal length of 200 mm and a focal length of 65.5 mm just before the focal length of 100 mm. Likewise, aberration data can be determined also according to a shooting distance and an aperture value by interpolation.

Next, a case where the shooting magnification is used as a parameter in place of the shooting distance as in the macro lens will be described. There is a case where the effect of the optical characteristics of the lens unit such as lens aberration and data of light falloff at edges cannot be determined from the shooting distance, the focal length, and the aperture value depending on a lens. For example, the macro lens is a typical case.

Figure 6A:
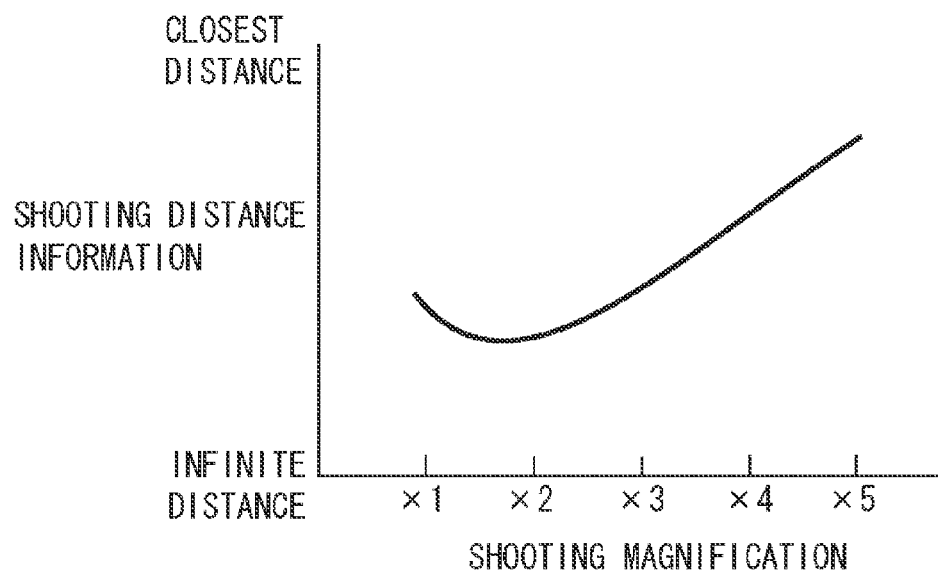
FIGS. 6A and 6B are graphs illustrating certain optical characteristics of a lens unit in the first exemplary embodiment.

FIG. 6A is a graph that illustrates a relationship between the shooting distance and shooting magnification in the macro lens. It can be found that the shooting magnification and the shooting distance do not have a relation of 1:1. In a lens called the macro lens, when a focusing operation is performed, the size (view angle) of an object is also changed generally. In contrast, as illustrated in FIGS. 5A and 5B, the macro lens also has correction data for each shooting magnification. Accordingly, when characteristics as illustrated in the graph of FIG. 6A are provided as in the macro lens, correction data has plural solutions in shooting distance information. In this case, it is not appropriate to determine correction data for correcting the effect due to the optical characteristics of the lens unit based on the shooting distance.

Figure 6B:
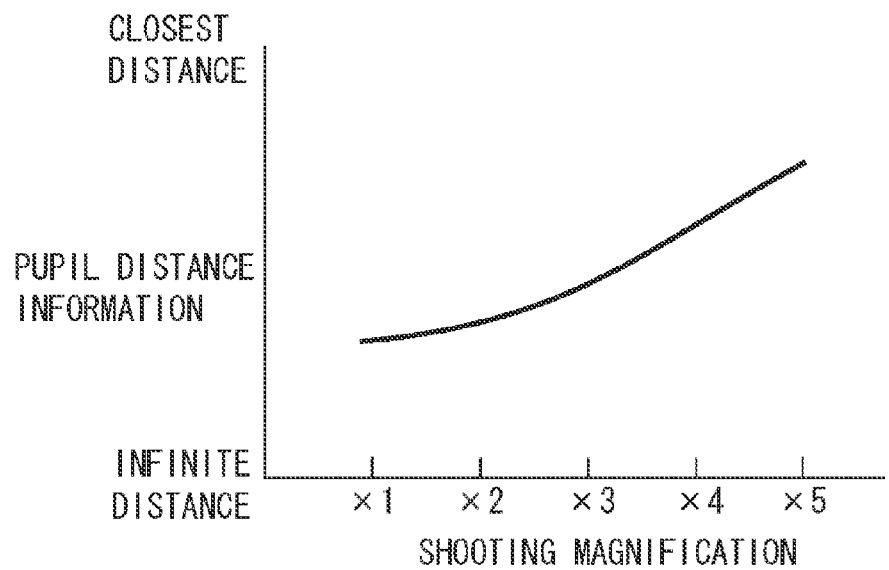

To cope with the above situation, one aspect of the present invention considers an exit pupil distance (hereinafter, also referred to as "pupil distance"). FIG. 6B illustrates a relationship between the exit pupil distance (hereinafter, simply called also the pupil distance) and the shooting magnification. As illustrated in FIG. 6B, the pupil distance is proportional to the shooting magnification. Correction data according to the shooting magnification can be determined using information corresponding to the pupil distance proportional to the shooting magnification.

A correction table to be selected is replaced according to a type of the lens unit, and the correction data is calculated by adding shooting information for generating correction data for correcting the optical characteristics of the lens unit to the calculated correction table. The shooting information of the lens unit is selected and determined from the shooting distance, the focal length, the aperture value, the exit pupil distance, and the like. In the above-described configuration, a correction table is selected depending on the type of a lens unit. In this respect, a correction table can be calculated according to the type of a lens unit. However, in this instance, a calculation load may be imposed on the CPU 36.

FIG. 7 illustrates a part of a process performed by the digital camera 2 when an interchangeable lens unit is mounted on the digital camera 2.

The process starts when power is supplied from the digital camera 2 to the interchangeable lens unit 1 through the connection terminals of contact groups 15 and 28 of FIG. 1. In step S1, the CPU 36 of the digital camera 2 determines whether the release switch 40 is operated. If the release switch is not operated, the process waits for a predetermined period of time (NO in step S1). When the CPU 36 determines that the release switch is turned on (YES in step S1) the process advances to step S2. Then, in step S2, the CPU 36 starts communication with the lens unit 1. In step S3, first, the CPU 36 receives a lens ID as identification information of the lens unit 1. In step S4, the CPU 36 receives image data and acquires shooting information of the lens unit 1 when a captured image is acquired. The shooting information of the lens unit 1 corresponds to parameters such as the focal length, the shooting distance, the aperture value, the exit pupil distance, or other parameter obtained during shooting.

In step S5, a correction table corresponding to the lens ID and shooting information received at steps S3 and S4, respectively, is selected. Information necessary to correct the image data affected by the optical characteristics of the lens unit 1 is stored on the correction table, as described with reference to FIGS. 5A and 5B. Alternatively, for example, a correction table may be stored in an external device (e.g., in a personal computer). In such a case, data from the correction table can be moved from the external device to the memory (2) 37 of the digital camera 2. Otherwise, the data may be moved to the memory (2) 37 of the digital camera 2 from a server connected to a network without involving the personal computer.

In step S6, the process refers to a lens information flag in the selected correction table. If the lens information flag is 0 (YES in step S6), information corresponding to the shooting distance is selected as the shooting information. In contrast, if the lens information flag is 1 (NO in step S6), information corresponding to the exit pupil distance is selected. That is, when the lens information flag is 0, it means that the correction table is a correction table for calculating correction data by adding information corresponding to the shooting distance in place of the pupil distance. In contrast, when the lens information flag is 1, it means that the correction table is a correction table for calculating the correction data by adding information corresponding to the pupil distance in place of the shooting distance.

More specifically, if the lens information flag is 0 (YES in step S6), then in step S7, the correction data is calculated from a selected correction table using the focal length, the shooting distance, and the aperture value as inputs and is then loaded on the memory 37. In contrast, if the lens information flag is 1 (NO in step S6), then in step S8, the correction data is calculated from a selected correction table using the focal length, the exit pupil distance, and the aperture value as input and is then loaded on the memory 37. In step S9, the correction data loaded on the memory 37 is moved to the image processing circuit 33b, and image processing is performed based on the moved correction data. With the image processing, an image, in which the effect of the optical characteristics based on a lens position of the lens unit 1 such as light falloff at edges and aberration is corrected, can be obtained.

As described above, according to the present exemplary embodiment, image deterioration due to optical characteristics can be corrected depending on the lens unit when shooting is performed.

In the preceding embodiment, a digital camera has been described as an example of an information processing apparatus. However, the present invention is not limited thereto. Other information processing apparatuses, such as personal digital assistants (PDAs), portable computer devices (laptops), smart phones, or the like may be equally applicable as long as the information processing apparatus is embodied within the scope of at least one of the appended claims. Next, a case where the present invention is applied to a correction of the effect of the optical characteristics of the lens unit such as light falloff at edges and aberration based on a lens position during shooting will be described as a second exemplary embodiment. In the second embodiment, the correction is performed in a RAW development application or the like, where a personal computer acts as an example of information processing apparatus.

FIG. 8 illustrates a configuration of a digital camera according to a second exemplary embodiment of the invention. Similar components to those of first exemplary embodiment are denoted by the same reference numerals, and a description thereof is omitted. The digital camera 2 may have a mode for storing data output from a sensor before development, such as RAW data and the like. The RAW data is input into application software for developing the RAW data on a personal computer 40, where the application software can also be used to edit an image according to a user operation. When the application software is used, a captured image can be corrected with shooting information of when the captured image was obtained even if the digital camera 2 does not have a function for correcting the effect of the optical characteristics based on a lens position of the lens unit 1, such as light falloff at edges and aberration. Further, the user can change a degree of correction for correcting the effect of the optical characteristics.

When, for example, a lens ID for identifying a type the lens unit 1 when the captured image was obtained is found, the personal computer 40 can specify the lens unit 1 and calculate (select) a correction table corresponding to the lens unit 1. Then, correction data for correcting the effect of the optical characteristics based on the lens position of the lens unit 1, such as light falloff at edges and aberration, can be loaded on the personal computer 40 from the correction table and the shooting information of the lens unit 1.

There is considered a case where the RAW data is captured into the personal computer 40 through the external memory 39 and a case where it is directly captured into the personal computer 40 from the digital camera 2. When the RAW data is directly captured into the personal computer 40 from the digital camera 2, a method for a wired transmission using a cable and the like, a method for a wireless transmission, and the like are considered.

Further, there are considered a case where the shooting information of the lens unit when the captured image was obtained is associated with the RAW data and captured into the personal computer 40 through the external memory 39, a case where the shooting information is directly captured from the digital camera 2, and the like.

Figure 9:
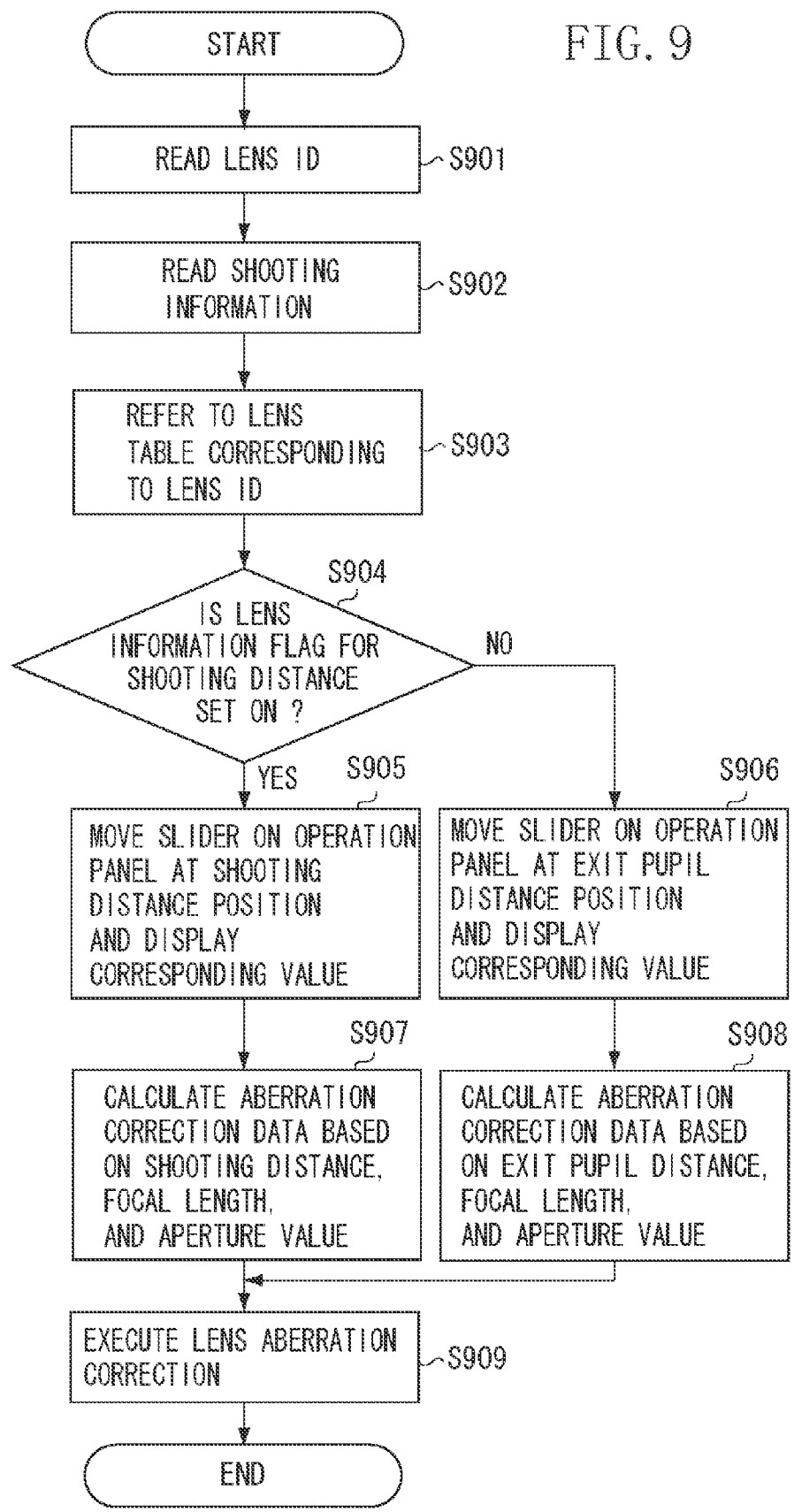
FIG. 9 is a flowchart illustrating part of a process performed by an information processing apparatus according to the second exemplary embodiment.

FIG. 9 illustrates a part of processing performed by the personal computer 40. In step S901, a lens ID is read as information for identifying the lens unit 1 from header information of the RAW data obtained from the CPU of the personal computer 40. Next, in step S902, the CPU of the personal computer 40 reads the shooting distance, the focal length, the aperture value, the exit pupil distance, and the like as the shooting information of the lens unit 1 when the captured image was obtained. In step S903, the personal computer 40 refers to a correction table corresponding to the lens ID. The correction table stores information necessary to correct the image data affected by the optical characteristics of the lens unit 1. For example, as described with reference to FIGS. 5A and 5B. The correction table exists as, for example, application software and is stored on a memory of the personal computer 40.

In step S904, the CPU of the personal computer 40 checks a lens information flag attached to the correction table. If the lens information flag is 0 (YES in step S904), the CPU selects information corresponding to the shooting distance as the shooting information. In contrast, if the lens information flag is 1 (NO in step S904), the CPU selects information corresponding to the exit pupil distance.

Figure 10A:
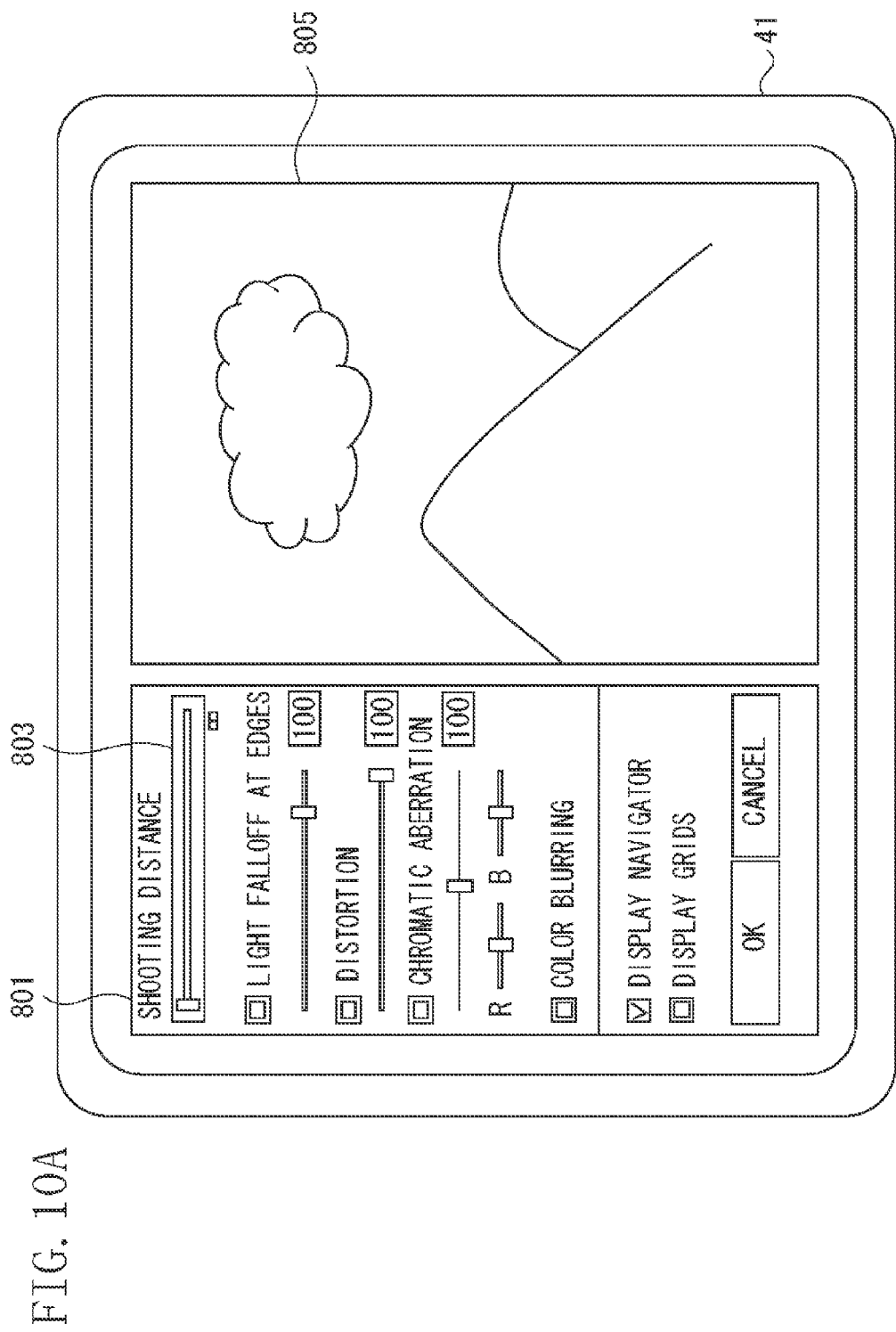

If the lens information flag is 0 (YES in step S904), then in step S905, the shooting distance is set as a slider to be displayed on a display 41 as an operation panel for an image correction to be described in FIGS. 10A and 10B. Further, in step S907, correction data is calculated from a selected correction table using the focal length, the shooting distance and the aperture value as inputs. The correction data is then loaded on the memory of the personal computer 40.

On the other hand, if the lens information flag is 1 (NO in step S904), then in step S906, the exit pupil distance is set as a slider to be displayed on the display 41 as the operation panel for the image correction to be described in FIGS. 10A and 10B. Further, in step S908, the correction data is calculated from a selected correction table using the focal length, the exit pupil distance and the aperture value as the inputs. The correction data is then loaded on the memory of the personal computer 40.

In step S909, the CPU of the personal computer 40 performs image processing on the RAW data based on the obtained correction data. The CPU of the personal computer 40 performs control so that an image, whose effect of the optical characteristics based on a lens position was corrected by performing the image processing and which was developed, is displayed on the display 41.

Next, a case is described with reference to FIGS. 10A and 10B in which the CPU of the personal computer 40 controls a display operation on the display 41 as an operation panel for image correction. The display control is performed in consideration of a case where information corresponding to the shooting distance is not provided, a case where information corresponding to a pupil distance is not provided likewise, and a case where a user manually changes a correction amount. In these cases, the user can move the slider on the operation panel to a position where the image that has been affected by the optical characteristics of the lens unit such as lens aberration or light falloff at edges can be most effectively corrected.

FIGS. 10A and 10B illustrate operation panels 801 and 802, respectively, for lens aberration correction in application software. Reference numerals 803 and 804 in FIGS. 10A and 10B, respectively, denote sliders that can be operated by the user via a mouse or a touch operation.

FIG. 10A illustrates a case where the lens information flag is 0 as described in step S5 in FIG. 9. In this case, the shooting distance is used for the slider 803 to be displayed on the display 41 as the operation panel for the image correction. The user can select the shooting distance as a parameter. When there is information corresponding to a shooting distance relating to an image 805 to be displayed, a position of the slider is determined from the information corresponding to the shooting distance as a default and displayed on the slider 803.

FIG. 10B illustrates a case where the lens information flag is 1 as described in step S6 in FIG. 9. In the case of FIG. 10B, the shooting magnification is used for the slider 804 to be displayed on the display 41 as the operation panel for the image correction. The user can select the shooting magnification as a parameter. A display of the shooting magnification is provided based on the information corresponding to the pupil distance. When there is information corresponding to the pupil distance relating to an image 806 to be displayed, a position of the slider is determined according to a magnification calculated from the information corresponding to the pupil distance as the default and displays the position on the slider 804.

In FIGS. 10A and 10B, the CPU of the personal computer 40 calculates the correction data from a correction table selected by the lens ID in response to an operation of the slider 803 or 804 operated by the user. When, for example, the user moves the slider 803 from a near side to an infinite side, the CPU performs image processing by calculating the correction data based on the data of the correction table using shooting distance information corresponding to a position after the slider 803 is moved. Further, when the user moves the slider 804 from four magnifications to two magnifications, the CPU performs image processing by calculating the correction data based on the data of the correction table using information corresponding to two magnifications. In the case of FIG. 10B, the CPU performs image processing by calculating the correction data based on the data of the correction table using magnification data of two magnifications after it is designated by the user. Otherwise, in FIG. 10A, the CPU performs the image processing by calculating the correction data based on the data of the correction table using information corresponding to the pupil distance corresponding to the magnification data of two magnifications after it is designated by the user. The latter case is advantageous in that it is not necessary to change a method for calculating the correction data from the correction table, and the former case is advantageous in that the correction data can be directly calculated from the magnification.

With this operation, lens aberration can be appropriately corrected even in a special lens such as the macro lens.

As described above, according to at least one exemplary embodiment of the present invention, image deterioration due to optical characteristics of the lens unit can be corrected depending on the position of the lens unit when shooting is performed.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

What is claimed is:

1. An information processing apparatus comprising:
an acquisition unit to acquire information of a lens unit related to image data;
a controller configured to control a display unit to display an image, which is related to the image data, captured using the lens unit and processed by an instruction of the controller, wherein processing of the image includes an image correction using lens position information of the lens unit, wherein the controller is configured to control the display unit to display parameters so that the image correction can be changed by an operator,
wherein the controller is configured to control the display unit to display a shooting distance as a parameter when the information of the lens unit indicates the lens unit is first information and to display a shooting magnification as the parameter when the information of the lens unit indicates the lens unit is second information, and
wherein the information of the lens unit includes information related to the lens position information of the lens unit at the time of shooting the image.

2. The information processing apparatus according to claim 1, wherein, by the image correction, an image affected by optical characteristics of the lens unit is corrected.

3. The information processing apparatus according to claim 1, wherein, by the image correction, an image affected by an aberration of the lens unit is corrected.

4. The information processing apparatus according to claim 1, wherein the parameter is displayed as a slider display.

5. The information processing apparatus according to claim 1, wherein the information of the lens unit is read from header information of the image data.

6. The information processing apparatus according to claim 1, wherein the information of the lens unit is read from header information of RAW data.

7. The information processing apparatus according to claim 1, wherein the image data corresponds to an image generated based on light which has passed through the lens unit.

8. The information processing apparatus according to claim 1, further comprising a memory configured to store information for the image correction.

9. The information processing apparatus according to claim 1, wherein the controller is configured to acquire information for the image correction from a server via network.

10. The information processing apparatus according to claim 1, wherein the first information and the second information are information for identifying the lens unit.

11. An information processing method, comprising:
acquiring information of a lens unit from image data;
controlling, using a controller, a display unit to display an image, which is related to the image data, obtained using lens position information of the lens unit, wherein the image processed by an instruction of the controller includes an image correction using the information of the lens unit related to the image data, wherein the controller is configured to control the display unit to display parameters so that the image correction is able to be changed by an operator,
wherein, in the controlling, the display unit is controlled to display a shooting distance as the parameter when the information of the lens unit indicates the lens unit is first information and to display a shooting magnification as the parameter when the information of the lens unit indicates the lens unit is second information, and
wherein the information of the lens unit includes information related to the lens position information of the lens unit at the time of shooting the image.

12. The information processing method according to claim 11, wherein, by the image correction, an image affected by an optical characteristics of the lens unit is corrected.

13. The information processing method according to claim 11, wherein, by the image correction, an image affected by an aberration of the lens unit is corrected.

14. The information processing method according to claim 11, wherein the controlling includes controlling the display unit to display the parameter as a slider display.

15. The information processing method according to claim 11, wherein the information of the lens unit is read from header information of the image data.

16. The information processing method according to claim 11, wherein the information of the lens unit is read from header information of RAW data.

17. The information processing method according to claim 11, wherein the image data corresponds to an image generated based on light which has passed through the lens unit.

18. The information processing method according to claim 11, further comprising storing information for the image correction in a memory.

19. The information processing method according to claim 11, further comprising acquiring information for the image correction from a server via network.

20. The information processing method according to claim 11, wherein the first information and the second information are information for identifying the lens unit.

21. An information processing method, comprising:
acquiring information of a lens unit from image data;
controlling a display unit to display an image, which is related to the image data, obtained using the lens unit and being processed by a controller, wherein the image being processed by the controller includes an image correction using the information of the lens unit related to the image data, wherein the controller is configured to control the display unit to display parameters so that the image correction can be changed by an input of an operator,
wherein, in the controlling, the display unit is controlled to display a shooting distance as a parameter when information acquired from the lens unit is first information and to display a shooting magnification as the parameter when information acquired from the lens unit is second information, and wherein the information of the lens unit acquired from the image data includes information related to a position of the lens unit at the time of shooting the image.

22. An information processing apparatus, comprising:
an acquisition unit to acquire information of a lens unit related to image data;
a controller configured to control a display unit to display an image, which is related to the image data, obtained using the lens unit and being processed by the controller, wherein the image being processed by the controller includes image correction using the information of the lens unit related to the image data,
wherein the controller is configured to control the display unit to display parameters that can be changed by an operator to perform image correction on the image being processed by the controller,
wherein the controller is configured to control the display unit to display a shooting distance as a parameter when the information acquired from the lens unit is first information and to display a shooting magnification as the parameter when the information acquired from the lens unit is second information,
wherein the information of the lens unit acquired from the image data includes information related to a position of the lens unit at the time of shooting the image.

23. The information processing apparatus according to claim 22, wherein the second information is information for indicating the lens unit is a macro lens.

24. The information processing method according to claim 21, wherein the first information is information for indicating the lens unit is other than a macro lens.

25. The information processing method according to claim 11, wherein the second information is information for indicating the lens unit is a macro lens.

26. The information processing method according to claim 11, wherein the first information is information for indicating the lens unit is other than a macro lens.

27. The information processing apparatus according to claim 1, wherein the second information is information for indicating the lens unit is a macro lens.

28. The information processing apparatus according to claim 1, wherein the first information is information for indicating the lens unit is other than a macro lens.

29. An information processing apparatus comprising:
an acquisition unit to acquire image data corresponding to an optical image, and lens information relating to a lens unit through which the optical image was taken; and
a controller configured to control a display unit to display an image based on the image data and a parameter which is to process the image data so that the parameter can be changed by an operator,
wherein the controller is configured to control the display unit to display shooting distance information as the parameter when the acquired lens information represents that the lens unit is a first type and to display shooting magnification information as the parameter when the acquired lens information represents that the lens unit is a second type, and
wherein the lens unit of the first type is a lens unit of which a shooting magnification to a change of a shooting distance corresponds to a change of the shooting distance in the relation of one-to-one, and the lens unit of the second type is a lens unit of which a shooting magnification to a change of a shooting distance does not correspond to a change of the shooting distance in the relation of one-to-one.

30. An information processing apparatus according to claim 29, wherein the lens information includes information related to position information of a predetermined lens in the lens unit.

31. An information processing apparatus according to claim 29, wherein the controller controls the display unit to display the image corrected in accordance with an operation of the operator.

32. An information processing apparatus according to claim 29, further comprising a correction unit to perform the image correction on the image as the processing of the image data, wherein, by the image correction, the image affected by optical characteristics of the lens unit is corrected.

33. An information processing apparatus according to claim 29, further comprising a correction unit to perform the image correction on the image data as the processing, wherein, by the image correction, the image affected by an aberration of a lens of the lens unit is corrected.

34. An information processing apparatus according to claim 29, wherein the parameter is displayed as a slider display.

35. An information processing apparatus according to claim 29, wherein the lens information is read from header information of the image data.

36. An information processing apparatus according to claim 29, wherein the lens information is read from header information of RAW data.

37. An information processing apparatus according to claim 29, wherein the image data corresponds to the image generated based on light which has passed through a lens of the lens unit.

38. An information processing apparatus according to claim 29, further comprising:
   a correction unit to perform an image correction on the image data as the processing; and
   a memory configured to store information for the image correction.

39. An information processing apparatus according to claim 29, further comprising
   a correction unit to perform an image correction on the image as the processing of the image data,
   wherein the controller is configured to acquire information for the image correction from a server via network.

40. An information processing apparatus according to claim 29, wherein the first information and the second information are information for identifying the lens unit.

41. A non-transitory computer readable storage medium that stores instructions for executing processes, wherein the processes comprising:
   acquiring image data corresponding to an image, and acquiring lens information relating to a lens unit through which the image was taken; and
   controlling a display unit to display the image and a parameter with which the image data corresponding to the image is allowed to be corrected by an operator,
   wherein the controlling the display unit includes selectively displaying shooting distance information as the parameter when the acquired lens information represents that the lens unit is a first type and displaying shooting magnification information as the parameter when the acquired lens information represents that the lens unit is a second type, and
   wherein the lens unit of the first type is a lens unit of which a shooting magnification to a change of a shooting distance corresponds to a change of the shooting distance in the relation of one-to-one, and the lens unit of the second type is a lens unit of which a shooting magnification to a change of a shooting distance does not correspond to a change of the shooting distance in the relation of one-to-one.

42. The non-transitory computer readable storage medium according to claim 41, wherein the lens information includes information related to position information of a predetermined lens in the lens unit.

43. The non-transitory computer readable storage medium according to claim 41, wherein the controlling controls the display unit to display the image corrected in accordance with an operation of the operator.

44. The non-transitory computer readable storage medium according to claim 41, further comprising instructions for performing the image correction on the image data as the processing, wherein, by the image correction, the image affected by optical characteristics of the lens unit is corrected.

45. The non-transitory computer readable storage medium according to claim 41, further comprising instructions for performing the image correction on the image data as the processing, wherein, by the image correction, the image affected by an aberration of a lens of the lens unit is corrected.

46. The non-transitory computer readable storage medium according to claim 41, wherein the parameter is displayed as a slider display.

47. The non-transitory computer readable storage medium according to claim 41, wherein the lens information is read from header information of the image data.

48. The non-transitory computer readable storage medium according to claim 41, wherein the lens information is read from header information of RAW data.

49. The non-transitory computer readable storage medium according to claim 41, wherein the image data corresponds to the image generated based on light which has passed through a lens of the lens unit.

50. The non-transitory computer readable storage medium according to claim 41, further comprising instructions for performing an image correction for the image data as the processing, and for storing information for the image correction in a memory.

51. The non-transitory computer readable storage medium according to claim 41, further comprising instructions for performing an image correction for the image data as the processing, wherein the controller is configured to acquire information for the image correction from a server via network.

52. The non-transitory computer readable storage medium according to claim 41, wherein the acquired lens information includes first information and second information for respectively identifying the lens unit as the first type or the second type.

* * * * *